United States Patent [19]

Jürgens et al.

[11] 4,092,881
[45] June 6, 1978

[54] APPARATUS FOR MAKING-UP AND BREAKING THREADED PIPE CONNECTIONS

[75] Inventors: Rainer Jürgens; Alfred Ostertag, both of Celle, Germany

[73] Assignee: Christensen, Inc., Salt Lake City, Utah

[21] Appl. No.: 736,728

[22] Filed: Oct. 29, 1976

[51] Int. Cl.² .............................................. B25B 13/50
[52] U.S. Cl. ..................................... 81/57.34; 29/240; 81/57.39
[58] Field of Search ................ 81/57.16, 57.19, 57.34, 81/57.39; 29/240

[56] References Cited

U.S. PATENT DOCUMENTS

| | | | |
|---|---|---|---|
| 3,246,547 | 4/1966 | O'Neill et al. | 81/57.34 |
| 3,256,757 | 6/1966 | Kochaver | 81/57.34 |
| 3,774,481 | 11/1973 | Goodman | 81/57.17 |
| 3,900,938 | 8/1975 | Blomgren et al. | 81/57.39 |

Primary Examiner—James L. Jones, Jr.
Attorney, Agent, or Firm—Subkow and Kriegel

[57] ABSTRACT

An apparatus for making-up and breaking a threaded connection between threaded tubular members, including a turnable chuck and a non-turnable chuck, each of which can be releasably clamped around its companion threaded tubular member, rotation of the turnable chuck in one direction making up the threaded connection, whereas rotation of the turnable chuck in the opposite direction breaking the threaded connection.

18 Claims, 8 Drawing Figures

APPARATUS FOR MAKING-UP AND BREAKING THREADED PIPE CONNECTIONS

The invention relates to an apparatus for the making-up and breaking of thread connections between tubular members, such as drill pipe strings, as well as between pipe and drilling tools for well bore drilling, comprising a turnable chuck and a non-turnable chuck, the chucks together being mounted about an apparatus main axis and being supported by a common carrier. Each chuck is adapted to receive one of two tube bodies having threaded end portions facing one another. A fluid operated torque producer rotates the turnable chuck in relation to the non-turnable chuck during clamping engagement between the chucks and the tube bodies.

In a known apparatus of this type employed for the making-up and breaking of thread connections in drilling rigs, etc., in well bore drilling, the two fluid operated chucks defining an apparatus main axis coinciding with the vertical drill string axis are formed by tongs adapted to be opened for receiving the tube bodies and closed to embrace the tube bodies, said tongs being secured to the end of a bracket in fixed closely spaced relation to one another. The tong-like chucks of such apparatus are suitable only for a small range of diameters of the tube bodies and limited in torque applying capacity.

The invention has for its object to provide an apparatus of the type initially referred to, which may be employed in maintenance and repair work shops for making-up and breaking thread connection of tube bodies of a large range of diameters, and, in addition, allows choice of the region of attack by the clamping chucks of the tube bodies to permit direct inspection and maintenance of the tube bodies while being retained in the apparatus.

According to the invention, this object is achieved in that the turnable chuck is seated in a stationary bearing rack supported at one end of a supporting structure. The non-turnable chuck is located on a supporting rack parallely displaceable and guided along the supporting structure towards and away from said bearing rack, the supporting structure being formed by an elongated distortion-free support beam parallel to the apparatus main axis and defining the path of movement of the supporting rack.

In this construction, the displaceable supporting rack containing the non-turnable chuck, in relation the stationary bearing rack supported at the end of the supporting structure and containing the turnable chuck, can be brought into a position which is the most favorable one for breaking or making-up thread connections of tube bodies, or the like. This construction furthermore allows complete unscrewing after release of the clamping engagement between the turnable chuck and the tube body received therein. It also permits the supporting rack and the tube body received and held therein to be displaced in a direction away from the stationary bearing rack. In this manner, it provides space between the threaded end portions of the two tube bodies, permitting direct servicing of the tube bodies, such as of the exposed threaded portions thereof, or parts surrounded thereby, without removal from the apparatus.

For screwing tube bodies together and making-up their thread connection, the supporting rack may be correspondingly displaced towards the stationary bearing rack in order to accomplish initial thread engagement between the two tube bodies and allow the tubes to be screwed together, as by hand rotating the tube body still disengaged from the turnable chuck, after which such tube body is clamped to and make-up torque applied to it by actuation of a torque producer which applies turning effort to the turnable chuck. The distortion-free support beam forming the supporting structure permits an appropriate extent of movement, such as 3 m, of the supporting rack during operating of the torque producer, both to break or make-up a thread connection. This ensures appropriate cooperation between supporting rack and the stationary bearing rack such that the tube bodies remain free of transverse and twisting or torsion forces. The chucks may be designed readily to cover the full diameter range of tube bodies and drill string parts employed in well bore drilling.

Numerous further features and advantages of the invention are apparent from the claims and the following description with reference to the accompanying drawings by way of example illustrating one embodiment of the invention.

Referring to the drawings.

Figure 1:
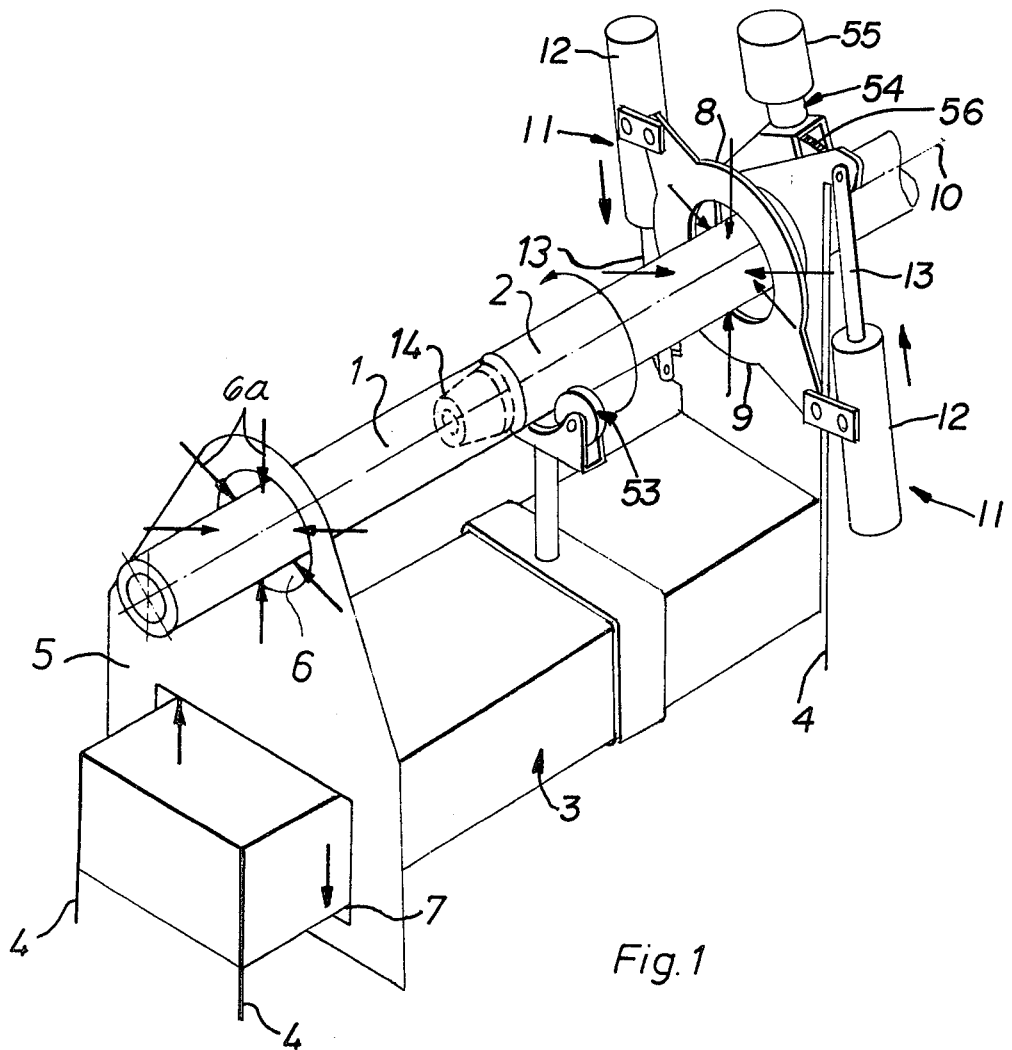
FIG. 1 is a perspective, diagrammatic view of the apparatus embodying the invention.

As disclosed by the diagrammatic view according to FIG. 1, the apparatus for making-up and breaking the thread connection between two tube bodies 1 and 2 comprises a distortion-free or rigid support beam 3 having a rectangular hollow cross-section and supported by legs or brackets 4 at the ends of the support beam by the ground surface (not shown) and preferably in a horizontal position. In lieu of the horizontal position, a vertical arrangement of the apparatus is also possible, in which, instead of the legs 4, brackets or like securing members are used for mounting the apparatus on a vertical wall surface, with the support beam 3 in front of the wall surface and spaced therefrom. In both cases, the apparatus can be swingable about a longitudinal axis in order to be moved into or withdrawn from a working area.

A supporing rack 5 is illustrated diagrammatically, having a through opening 6 in which a non-turnable chuck 6a for the tube body 1 extends. The lower portion of the rack has a rectangular opening 7 through which the support beam 3 extends with a small clearance. The supporting rack is displaceable along the support beam 3, of a length such as 3 m, towards or away from a chuck 9 which is stationary as regards translational motion, but which is rotatable, the chuck 9 being located opposite the supporting rack 5 in an end area of the support beam 3, the chuck being symbolized merely by an annular member 8.

The turnable chuck 9 and the non-turnable chuck of the supporting rack 5 together defining an apparatus main axis 10 coinciding with the axes of the tube bodies 1 and 2 when they are in clamped condition within the apparatus. A torque producer 11 is provided for turning the chuck 9 relative to the non-turnable chuck 6a. The torque producer 11 is formed by a pair of fluid operated double acting rotary drive cylinders and pistons 12 arranged on opposite sides of the apparatus main axis 10 and acting in the same rotational direction. As illustrated in FIG. 1, the cylinders are pivotally supported on the support beam 3, while piston rods 13 of the pistons are pivotally supported on the annular member 8 of the chuck 9.

FIG. 1 illustrates the rotary drive cylinders 12 of the torque producer 11 in a position for breaking the thread connection between tube bodies 1 and 2, said connection being shown at 14 in dotted lines and having a tapered form. Due to the increased power demand for breaking the connection, the fluid under pressure is applied to the entire piston area of the rotary drive cylinders 12, while for making-up the thread connection 14 the fluid under pressure is applied to the rod end of the rotary drive cylinders 12, the effective piston area being reduced by the piston rod diameter. The same pressure values of the fluid or pressure medium can be sufficient for both make-up and breaking of the threaded connection. The operating of the torque producer 11 for making-up or breaking a thread connection is effected with the chucks clampingly engaging the tube bodies 1 and 2. The supporting rack 5 is firmly supported on the support beam 3 by the edges of the through opening 7 abutting the beam, whereby transverse distortion of the tube bodies is avoided upon turning of the annular member 8 of chuck 9 in the same rotational direction, as generally illustrated by the force arrows shown in FIG. 1. Anchoring of the support beam 3 to the ground is therefore not required.

Figure 4:
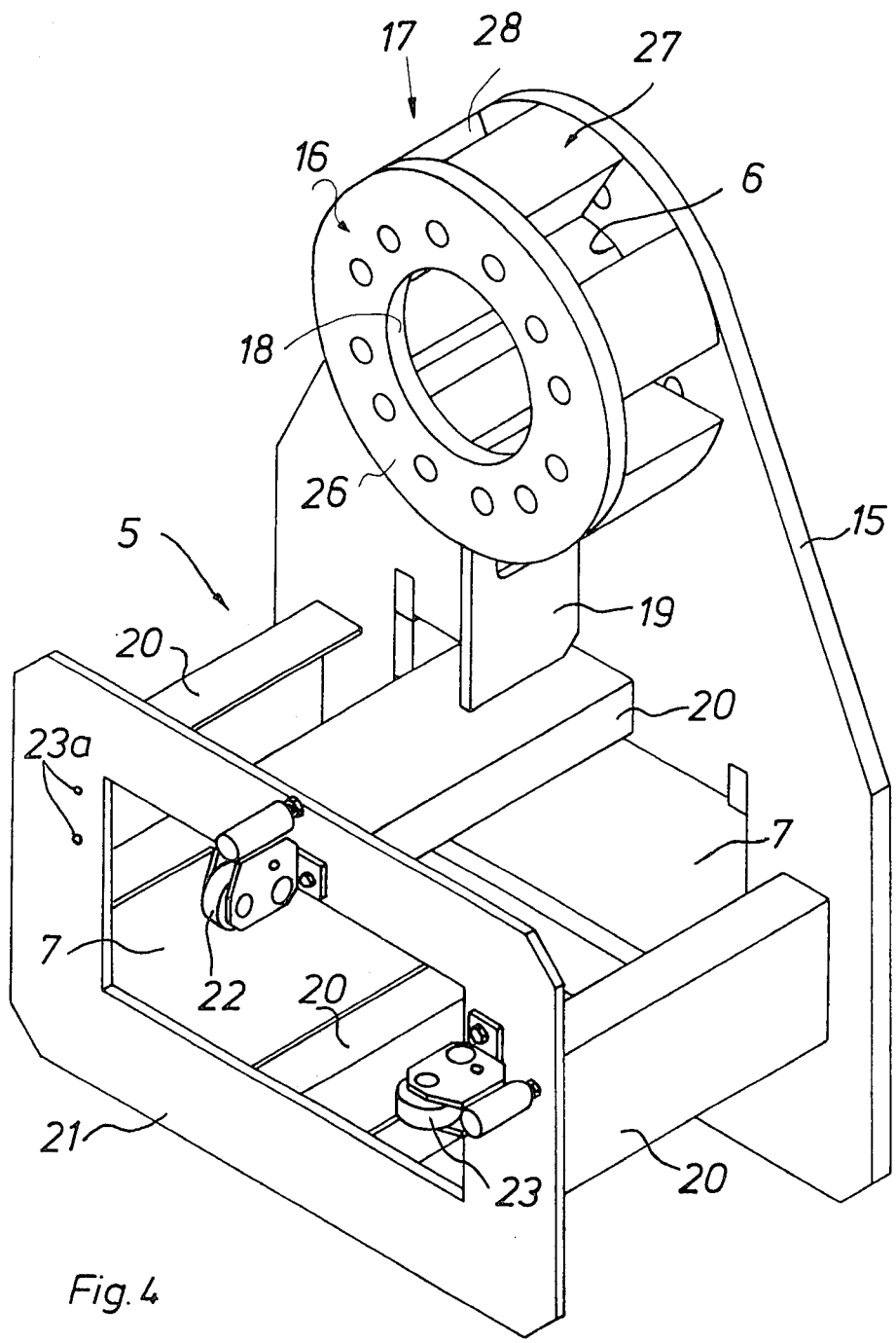
FIG. 4 is a perspective view of the supporting rack.

FIG. 4 shows the supporting rack 5 in an embodiment comprising a welded steel plate frame structure. Here the supporting rack 5 comprises a support cheek 15 provided with the through opening 6 for tube bodies and having secured thereto an annular member 16 forming a component of the non-turnable chuck 17 of the supporting rack 5, and providing a through opening 18 aligned with the through opening 6, both openings being arranged coaxially of the apparatus main axis 10. The annular member 16 is supported by a lower vertical plate 19, in turn supported on one of four struts 20 of U-section extending parallel to the apparatus main axis 10 and connecting a rectangular frame part 21 with the support cheek 15. The through opening 7 in the support cheek 15 receiving the support beam 3 has a corresponding through opening 7' in the frame part 21 which also receives the support beam 3.

Figure 2:
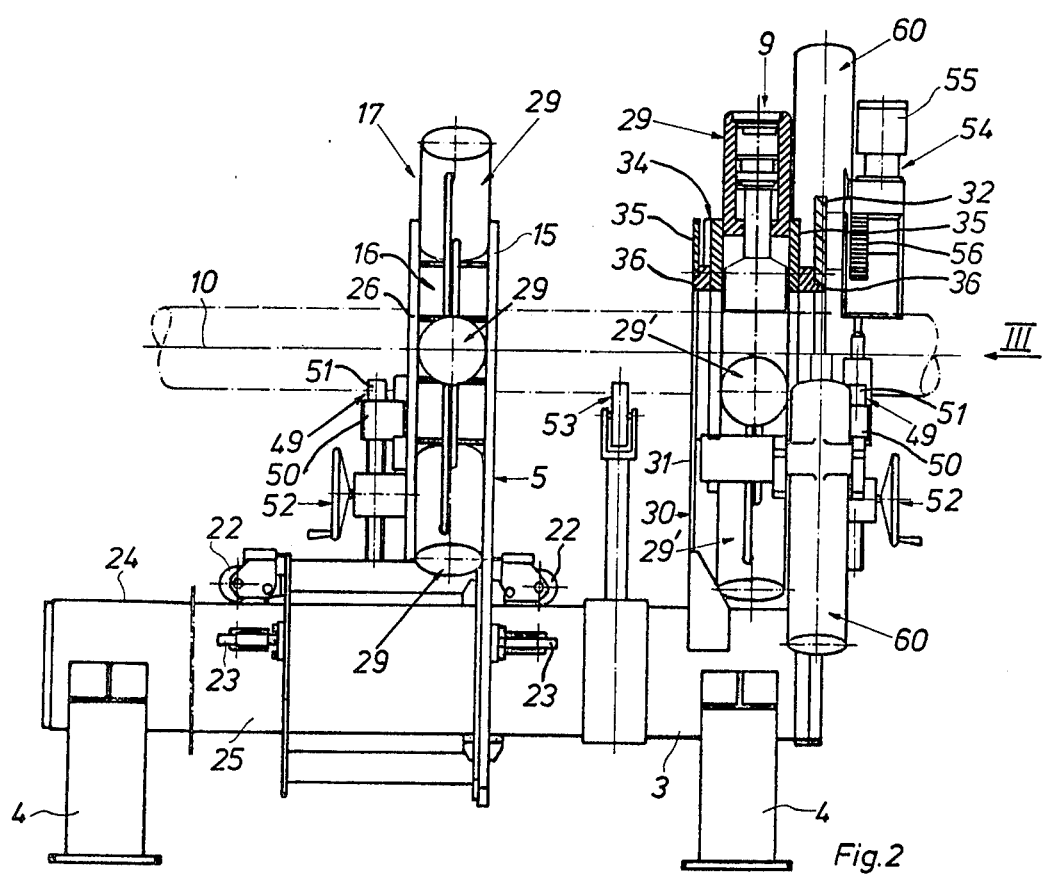
FIG. 2 is a side elevation of an embodiment of the apparatus in accordance with the present invention.

The supporting rack 5 is supported on the support beam 3 by guide and support rollers. FIG. 4 illustrates, on the frame part 21, an upper guide and support roller 22 having a horizontal axis of rotation, and a lateral guide and support rollers 22, 23 are secured to that side of the support cheek 15 facing the turnable chuck 9 (FIG. 2). Rollers 22 are in rolling engagement with the upper surface 24 and rollers 23 are in rolling engagement with the side surfaces 25 of the support beam 3 while the supporting rack 5 is being displaced. During operation of the torque producer 11 to make-up or break a thread connection, the rollers may be swung out to allow edge portions of the through opening 7 in the supporting block 5 to directly abut or bear against the torque beam 3, as will be explained hereinafter in detail with reference to FIG. 7.

In the embodiment according to FIG. 4 the annular member 16 of the non-turnable chuck 17 is formed by an annular disc 26 and an annular portion of the support cheek 15 located opposite to said annular disc, segments 27 extending therebetween defining radial through openings 28 for receiving and securing fluid operated clamping units 29 (FIG. 2) of the chuck 17. A plurality of, preferably six, clamping units 29 are provided which are uniformly distributed about the apparatus main axis 10.

Figure 3:
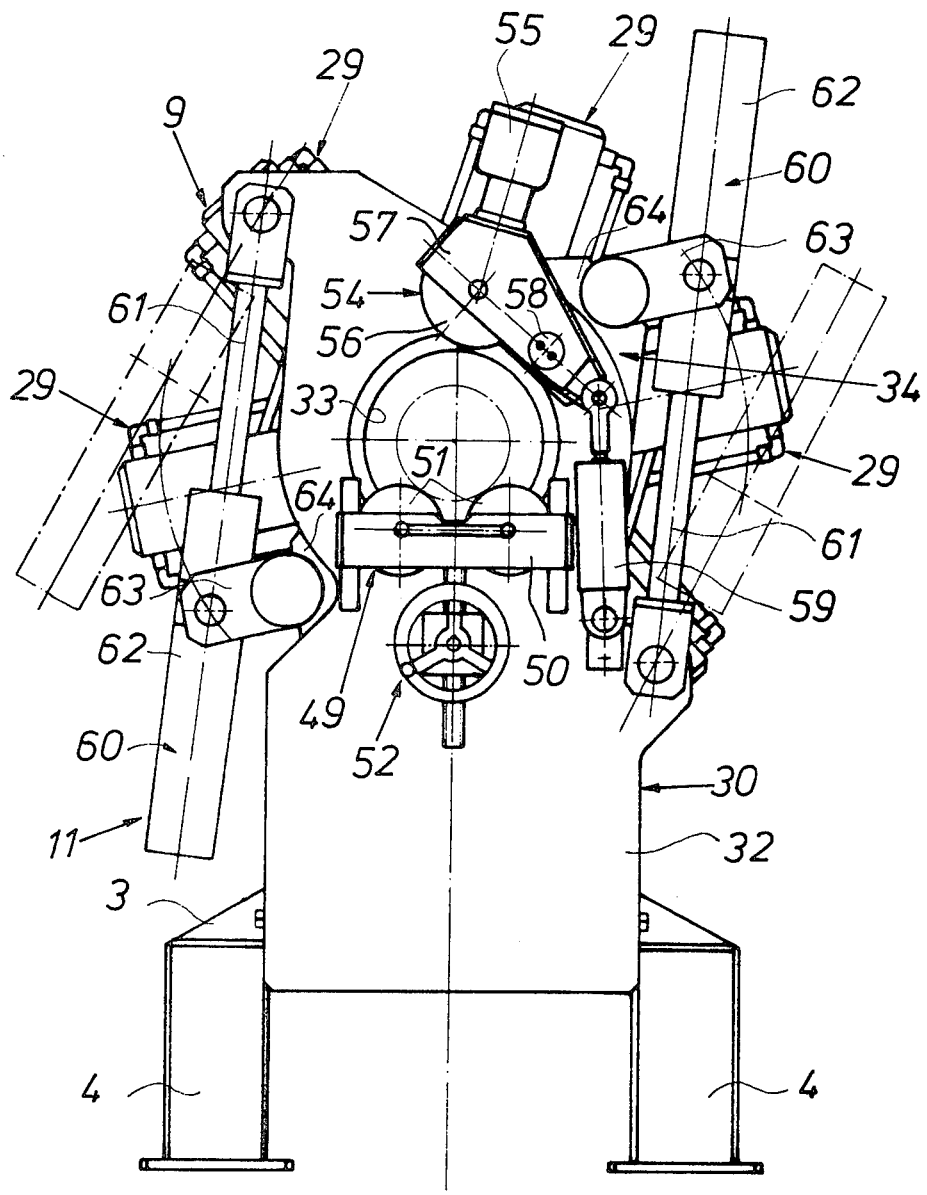
FIG. 3 is a front view of the apparatus shown in FIG. 2 in the direction of the arrow III.

FIGS. 2 and 3 illustrate a bearing rack 30 supporting the chuck 9 in turnable relation to the non-turnable chuck 17 and comprising two parallel support cheeks 31 and 32 spaced in relation to one another and having seated therebetween the turnable chuck 9, and each comprising a through opening 33 for tube bodies aligned with chuck 9 and extending co-axially to the apparatus main axis 10, said tube bodies being illustrated in dotted lines. The two support cheeks 31, 32 are secured to the end of support beam 3 so that the bearing rack 30 is stationary. While the annular member 16 of the non-turnable chuck 17 is secured to the support cheek 15 of the supporting rack 5, the turnable chuck 9 comprises an annular member 34, mounted for turning on the two support cheeks 31, 32 of bearing rack 30. To this end the annular member 34 comprises a pair of annular discs 35 having between them the segments 27, described with reference to FIG. 4, and provided with guide means 36 holding the annular member 34 against axial movement and guiding said member in the support cheeks 31, 32 for movement about the apparatus main axis 10. The same as non-turnable chuck 17, the turnable chuck 9 comprises six clamping units 29' uniformly distributed about the apparatus main axis 10, which are formed the same as clamping units 29. In the same manner as the latter are seated in the annular member 16, the units 29' are inserted into the associated annular member 34. This arrangement is described in detail with reference to FIGS. 4, 5 and 6 in connection with the chuck 17, the same description being applicable to the clamping units 29'.

Figure 5:
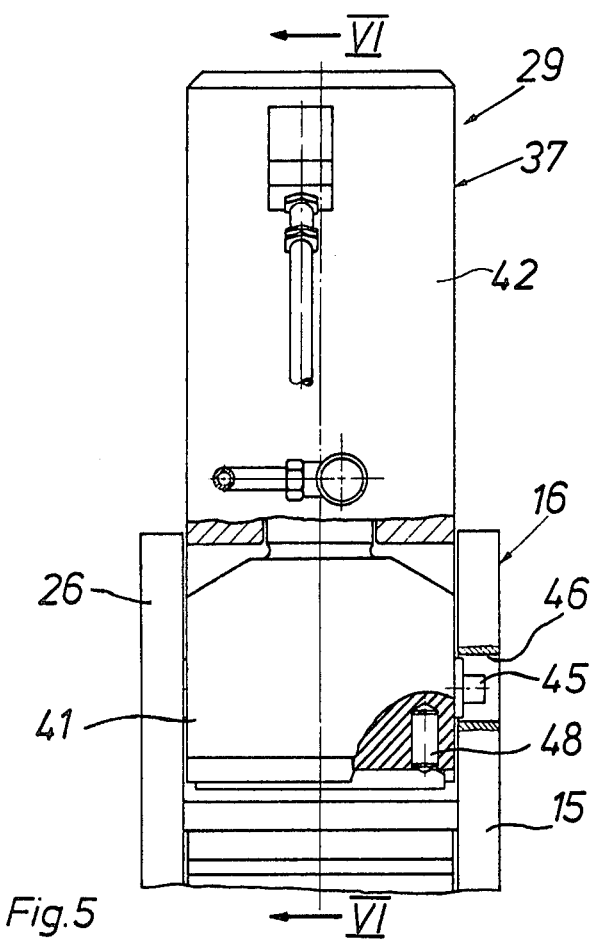
FIG. 5 is a view of a clamping unit of the chucks.
Figure 6:
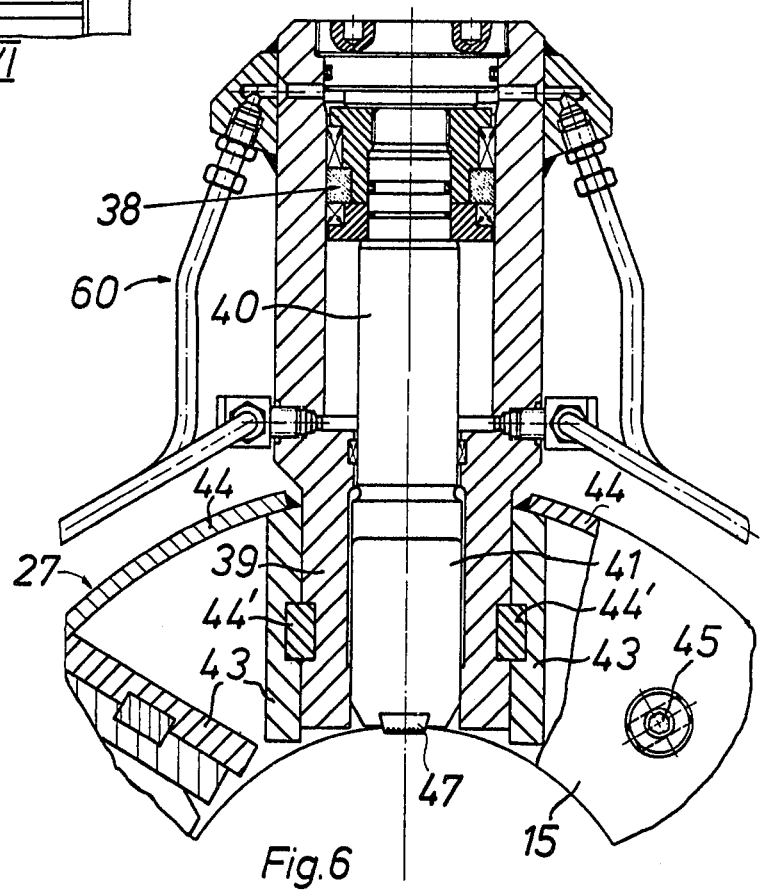
FIG. 6 is a section taken on line VI—VI of FIG. 5.

In FIGS. 4, 5 and 6, each clamping unit 29, 29' comprises a double acting clamping cylinder 37, having a portion 42 located outside the annular member 16 which guides a clamping piston 38 and encloses the fluid chambers on either side of the piston 38. In its inner portion within the annular member 16 and between the segments 27, the clamping cylinder 37 forms a guide 39 for a clamping pad 41 secured to the inner end of the piston rod 40. While the outer portion 42 of the clamping cylinder 37 is cylindrical, the inner portion forming the guide 39 has a rectangular cross-section corresponding to the radial through opening 28 between the segments 27 of annular member 16. The segments 27 are formed by axial side plates 43 inclined towards one another to form the radial through openings 28 and by outer or peripheral plates 44 welded to said side plates 43. The side plates 43, in turn, are bolted to the annular member 16 and secured to the support cheek 15.

The mounting of the clamping cylinder 37 in the radial through opening 28 thereof is achieved by keys 44' engaged in the side plates 43 and the guide 39 of the clamping cylinder 37. Threaded fasteners 45 secure the front ends of the keys 44' in openings 46 provided in the annular member 16 and the support cheek 15, respectively, so that after disconnecting the threaded fasteners 45 and retracting the keys 44' the respective clamping cylinder 37 can be replaced within a very short time. The free inner end of the clamping pad 41 which is engageable with the tube body is provided with a replaceable clamping ridge 47, the tube engagement surface of which is serrated. A ball retainer 48 is mounted in the clamping pad 41 to secure the clamping ridge in place.

For centering the tube bodies to be clamped in the apparatus, the supporting rack 5 and the bearing rack 30 each have at their front sides remote from one another an adjustable centering support 49 associated thereto. The centering supports 49 each comprise a pair of juxtaposed support rollers 51 arranged in a transverse plane symmetrical to the apparatus main axis 10 in a frame 50 vertically adjustable in transverse directions to the apparatus main axis 10 on the supporting rack 5 and the bearing rack 30, respectively, by setting means 52. Furthermore, provided between the supporting rack 5 and the bearing rack 30 is an intermediate support 53 for the tube bodies, which is displaceable along the torque beam 3 and can in turn be formed by two rollers corresponding to support rollers 51, said intermediate support being supported in vertically adjustable manner on the support beam 3 by suitable setting means.

The bearing rack 30 is furthermore provided with a spinning tool 54, which is engageable with a tube body extending through the bearing rack and serves to obtain quick unscrewing of a broken thread connection or quick screwing-in prior to making-up the thread connection. The spinning tool 54 comprises a roller 56 adapted to be driven by a fluid operated motor 55 at relatively high speed, said roller having a roughened, such as serrated, contact surface for engagement with the outer circumference of a tube body. The roller 56 is rotatably supported in a frame 57 pivotally mounted at 58 to the support cheek 32 of bearing rack 30. Linked to that end of the frame 57 remote from the roller 56 is the end of the piston rod of a fluid operated actuating cylinder 59, which in turn is pivotally connected to the supporting cheek 32. By means of the double acting actuating cylinder 59 the roller 56 of the spinning tool 54 is swingable from the inoperative position as illustrated in FIGS. 2 and 3 into a position in which it engages with the tube body shown in dotted lines, and back into the inoperative position. In the position of engagement between the spinning tool 54 and the tube body the turnable chuck 9 is held out of engagement with the tube body, while clamping engagement between the non-turnable chuck 17 and the tube body is maintained.

In the embodiment illustrated in FIGS. 2 and 3, the torque producer 11 is formed by a pair of fluid operated double acting rotary drive cylinders 60 arranged diametrically to the apparatus main axis 10 and acting in the same rotational direction, the piston rods 61 of said rotary drive cylinders being pivotally mounted on the support cheek 32 of the bearing rack 30, and the cylinders 62 being articulated between flaps 63 secured to extensions 64 of the annular member 34. The rotary drive cylinders 60 analogous the rotary drive cylinders 12 described with reference to FIG. 1 are arranged to impart to the tube body clamped in the chuck 9 of the bearing rack 30 a rotary motion for breaking the thread connection when applying pressure to said cylinders for extension of the piston rods 61. FIG. 3 illustrates in continuous lines the rotary drive cylinders 60 in their initial position for the making-up of a thread connection by applying pressure to the differential piston area, and in dotted lines in their initial position for breaking a thread connection by applying pressure to the full piston area.

Figure 7:
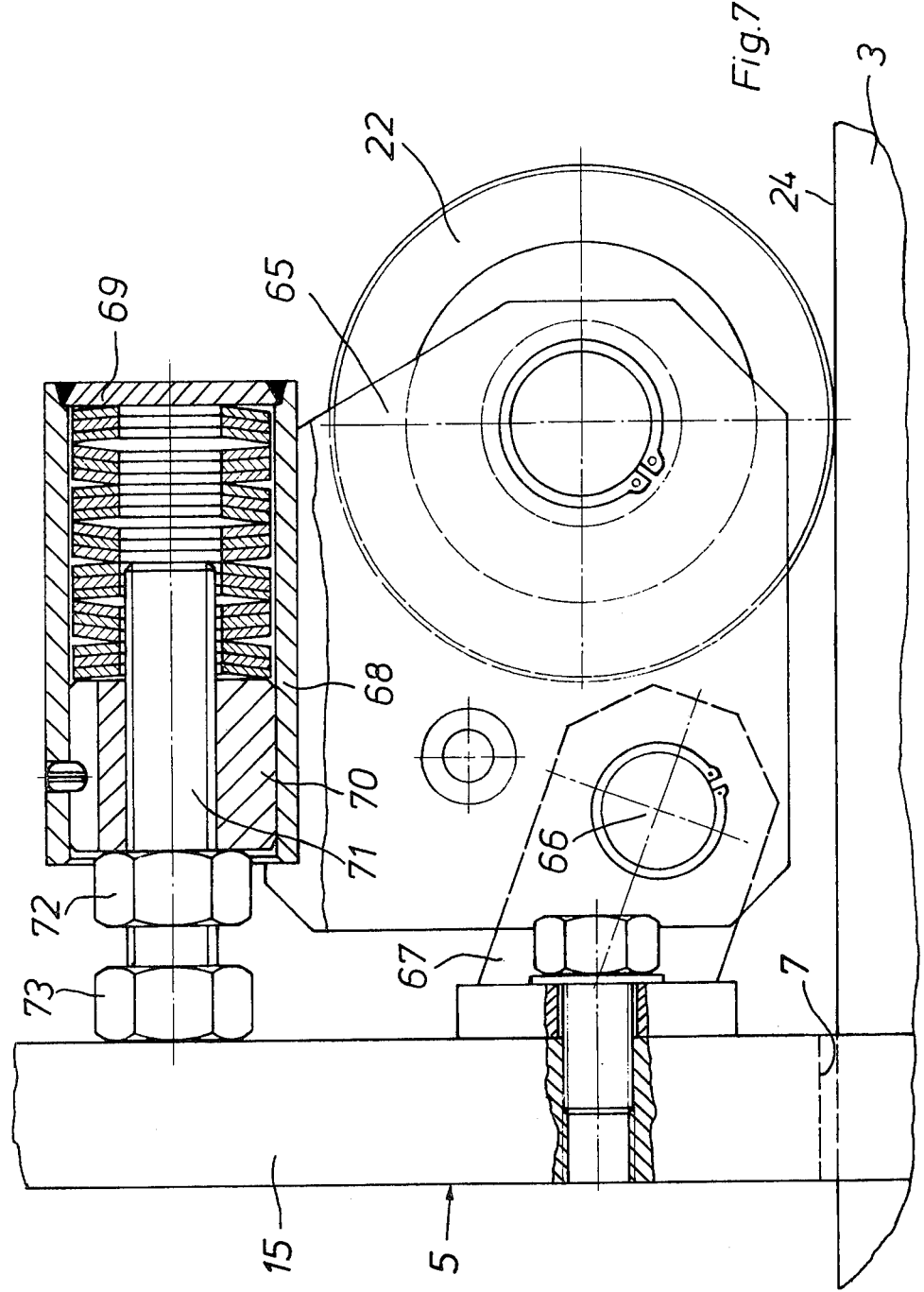
FIG. 7 is an enlarged view of one of the guide and support rollers of the supporting rack, partially in section.

FIG. 7 illustrates on a larger scale than FIG. 2 one of the guide and support rollers 22 in a position for displacing the supporting rack 5 by hand. Roller 22 is rotatably mounted in cheeks 65 pivotally mounted at 66 on a bracket 67 secured to the support cheek 15. The cheeks 65 support a spring housing 68 comprising plate springs 69 compressed by a thrust member 70 via a lock nut 72 screwed onto a bolt 71 to apply adjustable pressure sufficient to raise the edge portions of the through opening 7 in relation to the roller 22 supported via a stop nut 73 on the support cheek 15 as required for a displacement of the supporting rack 5. When operating the torque producer 11 the pressure of the plate springs 69 is, however, overcome, resulting in the edge portions of the through opening 7 bearing against the support beam 3 and the roller 22 swinging out about the axis 66, respectively.

Figure 8:
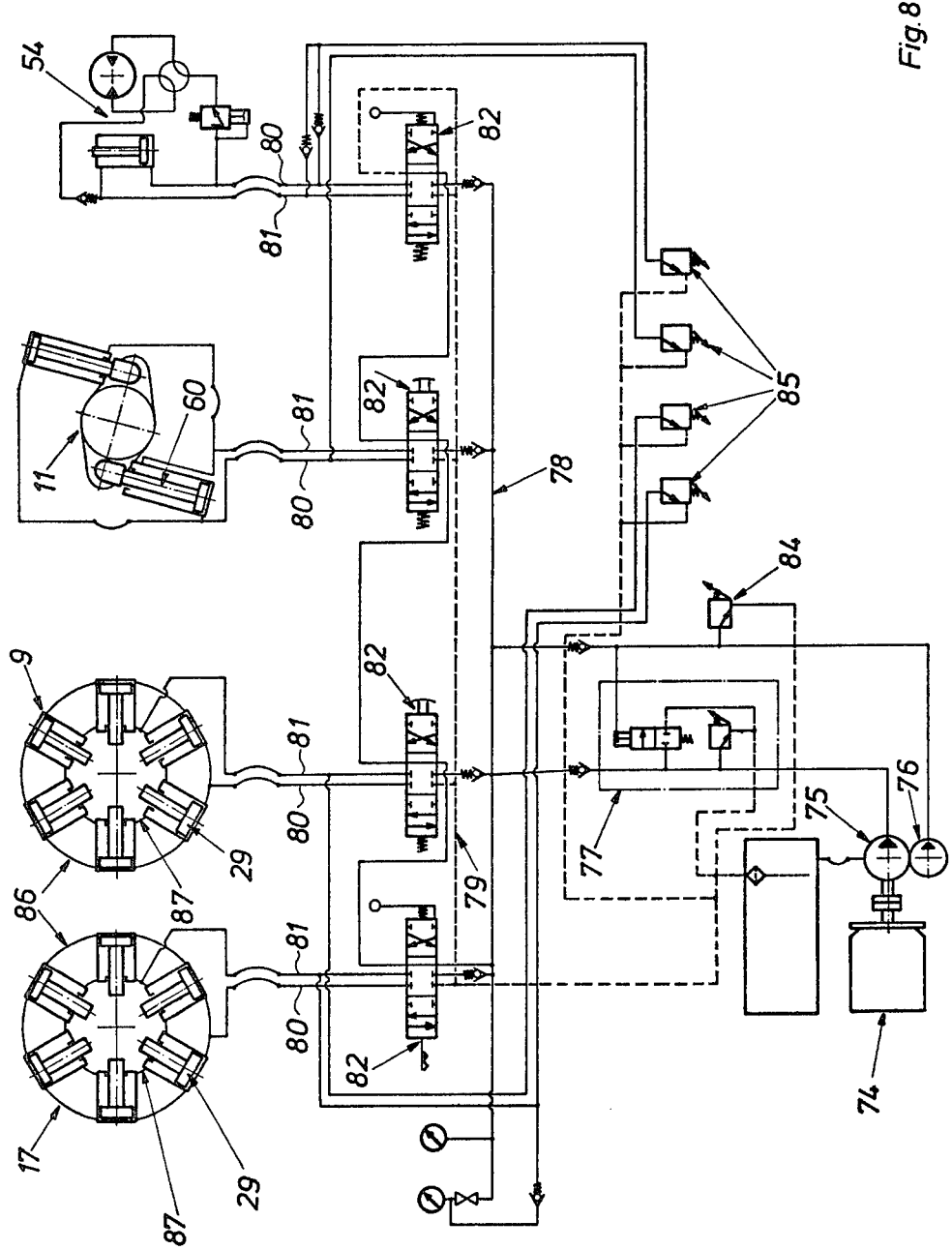
FIG. 8 is a hydraulic diagram for operating the apparatus according to the invention.

FIG. 8 illustrates a hydraulic diagram for operating the apparatus. 74 shows a two-stage fluid pump acting as a fluid or pressure medium source and comprising a low pressure member 75 and a connectible and disconnectible high pressure member 76. During the actual making-up or breaking step, connection and disconnection of the high pressure member 76 is effected by an automatic changeover switch 77 having a pressure relief valve. 78 shows the main feed line and 79 shows the main return line connected to corresponding feed lines 80 and return lines 81 communicating with the chucks 9 and 17, the torque producer 11 and the spinning tool 54. Between feed lines 78, 80 and return lines 79, 81 switch valves 82 for reversing pressure application are provided. At 84 an adjustable pressure relief valve is shown which allows control of the pressure for the torque to be applied for breaking or making-up in each case. For safety, preset pressure relief valves 85 are provided for the individual hydraulic circuits. Through a suitable program control, the chuck 9 must be in clamping engagement with a tube body before the torque producer 11 can become effective, chuck 17 being manually operable.

The cylinder chambers for the clamping stroke of the clamping cylinders 37 of clamping units 29, 29' of chucks 9, 17 are connected in series via a ring conduit 86, into which the feed line 80 opens between the clamping units 29, 29' remote from the support beam 3. In this manner, with the centering supports 49 brought into their centering positions, at first those clamping pads 41 situated opposite to said centering supports 49 will move into clamping engagement with the tube body ensuring maintenance of the set tube body centering.

The cylinder chambers for the return stroke of the clamping cylinders 37 of the clamping units 29, 29', too, are connected in series via a ring conduit 87, which communicates with the return line 81, 79 to the fluid source 74.

The piston area of clamping cylinders 37 is dimensioned larger than that of the rotary drive cylinders 60 so that equal fluid pressure slipping of the clamping pads 41 along the tube circumference during making-up or breaking of the thread connection is prevented. For determining the piston area ratio a coefficient of friction of approximately 0.5 between the surface of the tube body to be clamped and the clamping surface of the clamping pads 41 may be used as a calculation factor. This ensures that the clamping force of a clamping pad is at a ratio to the actual torque which can be received by the tube walls of the tube bodies without any deformations.

We claim:

1. Apparatus for the making-up and breaking of thread connections between tubular bodies and between drill strings and drilling tools for well bore drilling, comprising a supporting structure, a stationary bearing rack supported on said structure, a turnable fluid operated chuck seated on said bearing structure, a supporting rack mounted on said supporting structure for movement therealong towards and away from said bearing rack, a non-turnable fluid operated chuck mounted on said supporting rack in alignment with said turntable chuck to define a main axis therewith, said racks having coaxial openings through which the threaded tubular bodies can extend, a fluid operated torque producer for turning the turnable chuck relative to the non-turnable chuck during clamping engagement between the chucks and threaded tubular bodies therein, said supporting structure being formed by an elongated distortion-free unitary support beam disposed parallel to said main axis and defining the path of movement of said supporting rack, said stationary bearing rack and supporting rack being mounted between the end portions of said support beam and on the exterior of said unitary support beam to be supported thereby.

2. Apparatus as defined in claim 1; said support beam having a rectangular cross-section, and brackets secured to said beam for locating said beam in spaced relation to a supporting surface.

3. Apparatus as defined in claim 1, said supporting rack having an opening through which said support beam extends, the portion of said supporting rack defining said opening having a small clearance with said support beam.

4. Apparatus as defined in claim 2; said supporting rack having a rectangular opening through which said support beam extends, the sides of said opening having a small clearance with said support beam.

5. Apparatus as defined in claim 3; guide and support rollers on said supporting rack engaging said support beam to support said supporting rack thereon, means mounting said rollers for swinging from engagement with said beam to permit said portion of said supporting rack defining said opening to engage said support beam.

6. Apparatus as defined in claim 1; an intermediate support for tubular bodies between said supporting rack and bearing rack, said intermediate support being displaceable along said support beam.

7. Apparatus as defined in claim 6; and means for vertically adjusting said intermediate support.

8. Apparatus as defined in claim 1; said bearing rack comprising two parallel support cheeks in spaced relation to one another, said turnable chuck being seated between said cheeks, each cheek having said bearing rack opening for tubular bodies aligned with said turnable chuck and disposed coaxial of said main axis.

9. Apparatus as defined in claim 1; an adjustable centering support for a tubular body adjacent to the side of said supporting rack facing away from said bearing rack, and an adjustable centering support for a tubular body adjacent to the side of said bearing rack facing away from said supporting rack.

10. Apparatus for the making-up and breaking of thread connections between tubular bodies and between drill strings and drilling tools for well bore drilling, comprising a supporting structure, a stationary bearing rack supported on said structure, a turnable fluid operated chuck seated on said bearing structure, a supporting rack mounted on said supporting structure for movement therealong towards and away from said bearing rack, a non-turnable fluid operated chuck mounted on said structure in alignment with said turnable chuck to define a main axis therewith, a fluid operated torque producer for turning the turnable chuck relative to the non-turnable chuck during clamping engagement between the chucks and threaded tubular bodies therein, said supporting structure being formed by an elongated distortion-free support beam disposed parallel to said main axis and defining the path of movement of said supporting rack, an adjustable centering support for a tubular body adjacent to the side of said supporting rack facing away from said bearing rack, and an adjustable centering support for a tubular body adjacent to the side of said bearing rack facing away from said supporting rack, each centering support comprising a frame and a pair of juxtaposed support rollers on said frame disposed in a transverse plane symmetrical to said main axis, and means for vertically adjusting said centering supports.

11. Apparatus as defined in claim 1; a spinning tool on said bearing rack engageable with a tubular body extending through said bearing rack to rotate said tubular body.

12. Apparatus as defined in claim 1; each chuck comprising an annular member, stationary means on said bearing rack mounting said annular member of said turntable chuck for turning about said main axis, and means rigidly securing the annular member of said non-turnable chuck to said supporting rack.

13. Apparatus as defined in claim 12; said annular members having radial through openings in which said fluid operated chucks are disposed.

14. Apparatus as defined in claim 13; each chuck comprising a plurality of clamping units uniformly distributed about said main axis.

15. Apparatus as defined in claim 14; each clamping unit comprising a double acting cylinder having a portion external of its annular member, a piston in said external cylinder portion, said cylinder having an internal portion secured to said annular member, a piston rod secured to said piston and guided by said internal portion, and a clamping pad secured to the inner end of said piston rod for engagement with a tubular body.

16. Apparatus as defined in claim 12; said torque producer comprising a pair of fluid double acting rotary drive cylinders on diametrically opposite sides of said main axis, piston rods in said rotary drive cylinders pivotally connected to said stationary means, and means pivotally connecting said cylinders to said annular member of said bearing rack.

17. Apparatus as defined in claim 16; means for supplying fluid pressure to the head ends of said rotary drive cylinders to extend said piston rods therefrom and rotate said bearing rack annular member and tubular body clamped in said turnable chuck in one direction to break the threaded connection between said tubular body and an associated tubular body clamped in said non-turnable chuck.

18. Apparatus as defined in claim 17; and means for supplying fluid pressure to the rod ends of said rotary drive cylinders to retract said piston rods therein and rotate said bearing rack annular member and tubular body in the opposite direction to make-up such threaded connection.

* * * * *